(12) United States Patent
Mihcak et al.

(10) Patent No.: US 7,406,195 B2
(45) Date of Patent: *Jul. 29, 2008

(54) ROBUST RECOGNIZER OF PERCEPTUALLY SIMILAR CONTENT

(75) Inventors: M. Kivanc Mihcak, Redmond, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,940

(22) Filed: Aug. 15, 2005

(65) Prior Publication Data

US 2005/0273617 A1    Dec. 8, 2005

Related U.S. Application Data

(62) Division of application No. 09/843,234, filed on Apr. 24, 2001, now Pat. No. 6,996,273.

(51) Int. Cl.
G06K 9/46 (2006.01)

(52) U.S. Cl. .................................................. 382/190

(58) Field of Classification Search .......... 382/181, 382/190, 201, 206, 207, 224
See application file for complete search history.

(56) References Cited

U.S. PATENT DOCUMENTS

| | | | |
|---|---|---|---|
| 4,773,039 A | 9/1988 | Zamora | |
| 5,093,869 A | 3/1992 | Alves et al. | |
| 5,210,820 A | 5/1993 | Kenyon | |
| 5,351,310 A | 9/1994 | Califano et al. | |
| 5,425,081 A | 6/1995 | Gordon et al. | |
| 5,465,353 A | 11/1995 | Hull et al. | |
| 5,535,020 A | 7/1996 | Ulichney | |
| 5,613,004 A | 3/1997 | Cooperman et al. | |
| 5,664,016 A | 9/1997 | Preneel et al. | |
| 5,687,236 A | 11/1997 | Moskowitz et al. | |

(Continued)

FOREIGN PATENT DOCUMENTS

EP    0581317    2/1994

(Continued)

OTHER PUBLICATIONS

Chen et al., "Achievable Performance of Digital Watermarking Systems" IEEE 1999 pp. 13-18.

(Continued)

*Primary Examiner*—Colin LaRose
(74) *Attorney, Agent, or Firm*—Lee & Hayes, PLLC

(57) ABSTRACT

An implementation of a technology is described herein for recognizing the perceptual similarity of the content of digital goods. At least one implementation, described herein, introduces a new hashing technique. More particularly, this hashing technique produces hash values for digital goods that are proximally near each other, when the digital goods contain perceptually similar content. In other words, if the content of digital goods are perceptually similar, then their hash values are, likewise, similar. The hash values are proximally near each other. This is unlike conventional hashing techniques where the hash values of goods with perceptually similar content are far apart with high probability in some distance sense (e.g., Hamming). This abstract itself is not intended to limit the scope of this patent. The scope of the present invention is pointed out in the appending claims.

9 Claims, 4 Drawing Sheets

U.S. PATENT DOCUMENTS

| | | | |
|---|---|---|---|
| 5,689,639 | A | 11/1997 | Schwarz |
| 5,734,432 | A | 3/1998 | Netravali et al. |
| 5,774,588 | A | 6/1998 | Li |
| 5,802,518 | A | 9/1998 | Karaev et al. |
| 5,809,498 | A | 9/1998 | Lopresti et al. |
| 5,875,264 | A | 2/1999 | Carlstrom |
| 5,899,999 | A | 5/1999 | De Bonet |
| 5,915,038 | A | 6/1999 | Abdel-Mottaleb et al. |
| 5,918,223 | A | 6/1999 | Blum et al. |
| 5,953,451 | A | 9/1999 | Syeda-Mahmood |
| 6,081,893 | A | 6/2000 | Grawrock et al. |
| 6,101,602 | A | 8/2000 | Fridrich |
| 6,246,777 | B1 | 6/2001 | Agarwal et al. |
| 6,249,616 | B1 | 6/2001 | Hashimoto |
| 6,278,385 | B1 | 8/2001 | Kondo et al. |
| 6,314,192 | B1 | 11/2001 | Chen et al. |
| 6,321,232 | B1 | 11/2001 | Syeda-Mahmood |
| 6,330,672 | B1 | 12/2001 | Shur |
| 6,363,381 | B1 | 3/2002 | Lee et al. |
| 6,363,463 | B1 | 3/2002 | Mattison |
| 6,370,272 | B1 | 4/2002 | Shimizu |
| 6,377,965 | B1 | 4/2002 | Hachamovitch et al. |
| 6,385,329 | B1 | 5/2002 | Sharma et al. |
| 6,401,084 | B1 | 6/2002 | Ortega et al. |
| 6,418,430 | B1 | 7/2002 | DeFazio et al. |
| 6,425,082 | B1 | 7/2002 | Matsui et al. |
| 6,477,276 | B1 | 11/2002 | Inoue et al. |
| 6,513,118 | B1 | 1/2003 | Iwamura |
| 6,522,767 | B1 | 2/2003 | Moskowitz et al. |
| 6,532,541 | B1 | 3/2003 | Chang et al. |
| 6,546,114 | B1 | 4/2003 | Venkatesan et al. |
| 6,574,348 | B1 | 6/2003 | Venkatesan et al. |
| 6,584,465 | B1 | 6/2003 | Zhu et al. |
| 6,625,295 | B1 | 9/2003 | Wolfgang et al. |
| 6,647,128 | B1 | 11/2003 | Rhoads |
| 6,658,423 | B1 | 12/2003 | Pugh et al. |
| 6,658,626 | B1 | 12/2003 | Aiken |
| 6,671,407 | B1 | 12/2003 | Venkatesan et al. |
| 6,674,861 | B1 | 1/2004 | Xu et al. |
| 6,687,416 | B2 | 2/2004 | Wang |
| 6,700,989 | B1 | 3/2004 | Itoh et al. |
| 6,701,014 | B1 | 3/2004 | Syeda-Mahmood |
| 6,725,372 | B1 | 4/2004 | Lewis et al. |
| 6,751,343 | B1 | 6/2004 | Ferrell et al. |
| 6,754,675 | B2 | 6/2004 | Abdel-Mottaleb et al. |
| 6,768,809 | B2 | 7/2004 | Rhoads et al. |
| 6,768,980 | B1 | 7/2004 | Meyer et al. |
| 6,771,268 | B1 | 8/2004 | Crinon |
| 6,782,361 | B1 | 8/2004 | El-Maleh et al. |
| 6,799,158 | B2 | 9/2004 | Fischer et al. |
| 6,839,673 | B1 | 1/2005 | Choi et al. |
| 6,864,897 | B2 | 3/2005 | Brand |
| 6,879,703 | B2 | 4/2005 | Lin et al. |
| 6,901,514 | B1 | 5/2005 | Iu et al. |
| 6,907,527 | B1 | 6/2005 | Wu |
| 6,971,013 | B2 | 11/2005 | Mihcak et al. |
| 6,973,574 | B2 | 12/2005 | Mihcak et al. |
| 6,990,444 | B2 | 1/2006 | Hind et al. |
| 6,990,453 | B2 | 1/2006 | Wang et al. |
| 6,996,273 | B2 | 2/2006 | Mihcak et al. |
| 7,095,873 | B2 | 8/2006 | Venkatesan et al. |
| 2002/0126872 | A1 | 9/2002 | Brunk et al. |
| 2002/0154778 | A1 | 10/2002 | Mihcak et al. |
| 2002/0172394 | A1 | 11/2002 | Venkatesan et al. |
| 2002/0196976 | A1 | 12/2002 | Mihcak et al. |
| 2003/0056101 | A1 | 3/2003 | Epstein |
| 2003/0095685 | A1 | 5/2003 | Tewfik et al. |
| 2003/0118208 | A1 | 6/2003 | Epstein |
| 2003/0133591 | A1 | 7/2003 | Watanabe et al. |
| 2003/0169269 | A1 | 9/2003 | Sasaki et al. |
| 2003/0219144 | A1 | 11/2003 | Rhoads et al. |
| 2004/0001605 | A1 | 1/2004 | Venkatesan et al. |
| 2005/0065974 | A1 | 3/2005 | Mihcak et al. |
| 2005/0071377 | A1 | 3/2005 | Mihcak et al. |
| 2005/0076229 | A1 | 4/2005 | Mihcak et al. |
| 2005/0084103 | A1 | 4/2005 | Mihcak et al. |
| 2005/0165690 | A1 | 7/2005 | Liu et al. |
| 2005/0180500 | A1 | 8/2005 | Chaing et al. |

FOREIGN PATENT DOCUMENTS

| | | |
|---|---|---|
| EP | 1 253 784 | 10/2002 |
| JP | 11-041571 | 2/1999 |
| JP | 2000-004350 | 1/2000 |
| JP | 2000050057 | 2/2000 |
| JP | 2000149004 | 5/2000 |
| JP | 2000261655 | 9/2000 |
| JP | 2000332988 | 11/2000 |
| JP | 2000350007 | 12/2000 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 | 5/2002 |

OTHER PUBLICATIONS

Lee et al., "Adaptive Video Watermarking Using Motion Information" Proc SPIE vol. 3971: Security and Watermarking of Multimedia Contents II Jan. 2000 pp. 209-216.

Echlzen et al., "General Quality Maintenance Module for Motion Picture Watermarking" IEEE Trans. on Consumer Electronics vol. 45, No. 4, Nov. 1999 pp. 1150-1158.

Lin et al., "A Robust Image Authentication Method Distinguishing JPEG Compression from Malicious Manipulation", IEEE Transactions, Feb. 2001, vol. 11, No. 2, pp. 153-168.

Schnelder et al., "A Robust Content Based Digital Signature for Image Authentication", Proceedings, International Conference, Sep. 1996, vol. 3, pp. 227-230.

Mihcak, et al., "A Perceptual Audio Hashing Algorithm: A Tool For Robust Audio Identification and Information Hiding" Proceedings of the Information Hiding Workshop 2001 15 pages.

Malvar, "A Modulated Complex Lapped Transform and Its Applications to Audio Processing" IEEE ICASSP'99 Phoenix AZ. Mar. 1999 pp. 1-4.

Moulin et al, "A Framework for Evaluating the Data-Hiding Capacity of Image Sources" IEEE Transactions on Image Processing vol. 11 No. 9 Sep. 2002 pp. 1-14.

Wu et al., 'Video Access Control Via Multi-level Data Hiding' Proc. IEEE Int. Conf. on Multimedia and Expo vol. 1 Jul./Aug. 2000 pp. 381-384.

Fridrich et al., "Robust Hash Functions for Digital Watermarking" Proc. Int. Conf. on Information Technology: Coding and Computing Mar. 2000 pp. 178-183.

Miheak et al, "Watermarking via Optimization Algorithms for Quantizing Randomized Statistic of Image Regions" Proceedings of the Annual Allerton Conference on Communication Control and Computing Urbana IL 2002 10 pages.

Moulin et al, "The Parallel-Gaussian Watermarking Game" IEEE Transactions Information Theory Feb. 2004 pp. 1-36.

Venxatesan et al., "Robust Image Hashing" Proceedings of the IEEE-ICIP Vancouver BC Canada 2000 3 pages.

Chang, et al, RIME: A Replicated Image Detector for the World-Wide Web Proceedings of the SPIE vol. 3527 Nov. 2-4, 1998 pp. 58-67.

Chen et al., "Quantization Index Modulation Methods for Digital Watermarking and Information Embedding of Multimedia" Journal of VLSI Signal Processing 27 2001 pp. 7-33.

Mihcak et al., "New Iterative Geometric Methods for Robust Perceptual Image Hashing" Proceedings of the Security and Privacy Digital Rights Management Workshop 2001 9 pages.

Kesal, et al, "Iterativoly Decodable Codes for Watermarking Applications" Proceedings of the Second Symposium on Turbo Codes and Their Applications France Sep. 2000 4 pages.

Venkatesan et al., "Image Watermarking with Better Resilience" Proceedings of IEEE-ICIP Vancouver BC Canada 2000 4 pages.

Mihcak et al. "Cryptanalysis of Discrete-Sequence Spread Spectrum Watermarks" Proceedings of the Information Hiding Workshop Holland 2002 21 pages.

"Blind Image Watermarking Via Derivation and Quantization of Robust Semi-Global Statistics" Proceedings of IEEE-ICASSP Orlando FL 2002 4 pages.

M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.

M. K. Mihcak and R. Venkatesan, "A tool for robust audio information hiding: A perceptual audio hashing algorithm," submitted to Workshop on Information Hiding, Pittsburgh, PA.

T. Kalker and J. Haitsma, "Efficient detection of a spatial spread-spectrum watermark in MPEG video streams," Proc. IEEE ICIP, Vancouver, Canada, Sep. 2000.

I. J. Cox, J. Killian, T. Leighton, and T. Shamoon, "A secure robust watermark for multimedia," Information Hiding Workshop, University of Cambridge, pp. 185-206, 1996.

J. Dittman, M. Stabenau and R. Steinmetz, "Robust MPEG video watermarking technologies," Proceedings of ACM Multimedia '98. The 6th ACM International Multimedia Conference, Bristol, England, pp. 71-80.

B. Chen and G. W. Wornell, "Digital watermarking and information embedding using dither modulation," Proc. IEEE Workshop on Multimedia Signal Processing, Redondo Beach, CA, pp. 273-278, Dec. 1998.

F. A. P. Petitcolas and R. J. Anderson, "Evaluation of copyright marking systems," Proceedings of IEEE Multimedia Systems'99, vol. 1, pp. 574-579, Jun. 7-11 1999, Floernce, Italy.

Politis et al., "An Audio Signatures Indexing Scheme for Dynamic Content Multimedia Databases", Electrotechnical Conference, 2000, IEEE, vol. 2, May 29, 2000, pp. 725-728.

Chang et al., "A Spatial Match Representation Scheme for Indexing and Querying in Iconic Image Databases", 1997, ACM, Retrieved from the Internet http://portal.acm.org/citation.cfm?id=266890&coll=ACM&di=ACM&CFID=68519948&CFTOKEN=85922645.

El-Kwae et al., "Efficient Content-Based Indexing of Large Image Databases", Apr. 2000, ACM, Retrieved from the Internet: http://portal.acm.org/citation.cfm?id=348762&coll=ACM&dl=ACM&CFID=68519948&CFTOKEN=85922645.

Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.

Moreno et al., "Using the Fisher Kernal Method for Web Audio Classification", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2417-2420.

Pye, D., "Content-Based Methods for the Management of Digital Music", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2437-2440.

Cheng et al. "Aircraft identification based on the algebraic method" Hybrid Image and Signal Processing III, vol. 1702, Apr. 23, 1992, pp. 298-305.

Kozat S. S. et al., "Robust Preceptual Image Hashing Via Matrix Invariants" Image Processing, 2004, Oct. 24, 2004.

Venkatesan, et al., "Image Hashing", Mircosoft Research, Mar. 24, 2000, pp. 1-8.

B. Chen and G. W. Wornell, "Quantization Index Modulation: A class of Provably Good Methods for Digital Watermarking and Information Embedding," IEEE Trans. Inform. Theory, 1999 and 2000, pp. 1-54.

B. Chen and G. W. Wornell, "Dither modulation: a new approach to digital watermarking and information embedding," Proc. of SPIE: Security and Watermarking of Multimedia Contents, vol. 3657, pp. 342-353, 1999.

Echizen, Isao et al., "General Quality Maintenance Module for Motion Picture Watermarking", IEEE Transactions on Consumer Electronics, vol. 45, No. 4, Nov. 1999, 9 pages.

Takeuchi, Kazuki et al., "Image ID Extraction by Content Analysis and its Applications", Nov. 24, 2000, 8 pages.

"The Singular Value Decomposition", at <<http://www2.imm.dtu.dk/~pch/Projekter/tsvd.html>>, Aug. 20, 1999, pp. 3.

Tsuji, Yasuhiro, et al., "Local Patterns of a Melody and its Applications to Retrieval by Sensitivity Words", IEICE Technical Report, Mar. 6, 1997, vol. 96, No. 565, SP96-124, pp. 17-24.

Yoshino, Taichi et al., "An Automated Metadata Creation Method for Musci Data and its Application to Semantic Associative Search", Technical Report of Information Processing Society of Japan, Jul. 10, 1998, vol. 98. No. 58, 98-DBS-116, pp. 109 to 116.

Before iterative Geometric Region Growing (GRG)

After iterative GRG

Original

Noisy Original

ROBUST RECOGNIZER OF PERCEPTUALLY SIMILAR CONTENT

RELATED APPLICATIONS

This application is a divisional of and claims priority to U.S. patent application Ser. No. 09/843,234, filed Apr. 24, 2001 now U.S. Pat. No. 6,996,273, the disclosure of which is incorporated by reference herein.

TECHNICAL FIELD

This invention generally relates to a technology for recognizing the perceptual similarity of the content of digital goods.

BACKGROUND

Creative content—such as music, imagery, video, film, and the like—is increasingly converted into an electronic form or stored in such a form. Often, such content is originally recorded (i.e., created) in an electronic form. More particularly, this electronic form is typically digital.

"Digital goods" is a generic label for electronically stored or transmitted content, such as creative content. Examples of digital goods include images, audio clips, video, multimedia, software, and data. Digital goods may also be called a "digital signal," "content signal," "digital bitstream," "media signal," "digital object," "object," and the like.

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Digital goods offer many advantages over conventional analog media in terms of quality and ease of transmission. With the ever-increasing popularity of the Internet, digital goods have become a mainstay ingredient of the Web experience.

Unfortunately, it is relatively easy for a person to pirate the pristine digital content of a digital good at the expense and harm of the content owners—which includes the content author, publisher, developer, distributor, etc. The content-based industries (e.g., entertainment, music, film, etc.) that produce and distribute content are plagued by lost revenues due to digital piracy.

Modern digital pirates effectively rob content owners of their lawful compensation. Unless technology provides a mechanism to protect the rights of content owners, the creative community and culture will be impoverished.

In addition, digital goods are often stored in databases. As these databases grow, the needs for categorizing goods are becoming increasingly important. The next generation of database management software will need to accommodate solutions for fast and efficient categorization of digital goods and protection of copyrights in those digital goods.

Hashing

Hashing techniques are used to protect the rights of content owners and to speed database searching/access. Hashing techniques are used in many areas such as database management, querying, cryptography, and many other fields involving large amounts of raw data.

In general, a hashing technique maps a large block of raw data into relatively small and structured set of identifiers. These identifiers are also referred to as "hash values" or simply "hash." By introducing a specific structure and order into raw data, the hashing function drastically reduces the size of the raw data into short identifiers. It simplifies many data management issues and reduces the computational resources needed for accessing large databases.

Mathematically, a hashing technique involves an implementation of a hashing function $H_K(\bullet)$. That function takes a signal x as input and computes a short vector $h=H_K(x)$. That vector is an apparently random value, which is indexed by a secret key K, in some large set. That vector h is a hash value.

The use of hashing techniques are many and indeed wide-ranging: compilers, checksums, searching and sorting techniques, cryptographic message authentication, one-way hashing techniques for digital signatures, time stamping, etc. These techniques usually accept binary strings as inputs and produce a hash value having a fixed length L. Typically, these techniques use random seeds (i.e., keys) of some type.

The hash values produced by such techniques are viewed as useful because they typically have following desirable characteristics:

Apparently Uniformly Distributed—For any given input, the output hash value are uniformly distributed among the possible L-bit outputs.

Approximate Pairwise Independent—For two distinct inputs, the corresponding outputs are statistically almost independent of each other.

Limitations of Conventional Hashing

Conventional hashing techniques are used for many kinds of data. These techniques have good characteristics and are well understood. Unfortunately, digital goods with visual and/or audio content present a unique set of challenges not experienced in other digital data. This is primarily due to the unique fact that the content of such goods are subject to perceptual evaluation by human observers. Typically, perceptual evaluation is visual and/or audible.

For example, assume that the content of two digital goods are, in fact, different, but only perceptually insubstantially so. A human observer may consider the content of two digital goods to be similar. However, even perceptually insubstantially differences in content properties (such as color, pitch, intensity, phase) between two digital goods result in the two goods appearing substantially different in the digital domain.

Thus, when using conventional hashing functions, a slightly shifted version of a digital good generates a very different hash value as compared to that of the original digital good, even though the digital good is essentially identical (i.e., perceptually same) to the human observer.

The human observer is rather tolerant of certain changes in digital goods. For instance, human ears are less sensitive to changes in some ranges of frequency components of an audio signal than other ranges of frequency components.

This human tolerance can be exploited for illegal or unscrupulous purposes. For example, a pirate may use advanced audio processing techniques to remove copyright notices or embedded watermarks from audio signal without perceptually altering the audio quality.

Such malicious changes to the digital good are referred to as "attacks", and result in changes at the data domain. Unfortunately, the human observer is unable to perceive these changes, allowing the pirate to successfully distribute unauthorized copies in an unlawful manner.

Although the human observer is tolerant of such minor (i.e., imperceptible) alterations, the digital observer—in the form of a conventional hashing technique—is not tolerant. Traditional hashing techniques are of little help identifying the common content of an original digital good and a pirated copy of such good because the original and the pirated copy hash to very different hash values. This is true even though both are perceptually identical (i.e., appear to be the same to the human observer).

Furthermore, traditional hashing techniques are of little help recognizing similar content of two digital goods. This is true even when both are perceptually similar (i.e., appear to be similar to the human observer). With conventional hashing techniques, the resulting hash values of goods with perceptually similar content are apparently completely different with a high degree of probability.

Applications for Hashing Techniques

There are many and varied applications for hashing techniques. Some include anti-piracy, content categorization, content recognition, content-based key generation, and synchronization of video signals.

Hashing techniques may be used to search for digital goods on the Web suspected of having been pirated. Like anti-piracy, semantic categorizing of the content of digital goods often requires subjective comparisons to other existing digital goods. Works of a similar nature are typically grouped into the same category. The content of digital goods may be semantically classified into any number of categories.

In addition, hashing techniques are used to generate keys based upon the content of a signal. These keys are used instead of or in addition to secret keys. Also, hashing functions may be used to synchronize input signals. Examples of such signals include video or multimedia signals. A hashing technique must be fast because synchronization is performed in real time.

Background Conclusion

Quickly and efficiently determining a hash value of a digital good is highly desirable. In addition, doing so that one can determine perceptual similarity of the content of a group of digital goods would improve anti-piracy efforts and semantic content categorization. It can improve content-based key generation and synchronization in video signals.

Accordingly, what is needed is a new hashing technique. A new technique is needed to overcome the difficulties that are brought by conventional hashing techniques when they are applied to multimedia data. Under perceptually unnoticeable changes, such techniques produce different hash values with high probability.

More particularly, a new hashing technique is needed where the hash values of digital goods are proximally near each other, when the digital goods contain perceptually similar content. Furthermore, such a new hashing technique may provide a significant step towards determining whether a particular specimen of a digital good is a pirated copy of an original good.

Moreover, these new techniques would improve existing content-based key generation, which is often employed in the watermarking. These new techniques would introduce improved synchronization so as to achieve synchronization in watermarking streaming multimedia data, such as video and audio

SUMMARY

Described herein is a technology for recognizing the perceptual similarity of the content of digital goods.

At least one implementation, described herein, introduces a new hashing technique. More particularly, this hashing technique produces hash values for digital goods that are proximally near each other, when the digital goods contain perceptually similar content. In other words, if the content of digital goods are perceptually similar, then their hash values are, likewise, similar. The hash values are proximally near each other. This is unlike conventional hashing techniques where the hash values of goods with perceptually similar content are far apart with high probability in some distance sense (e.g., Hamming).

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method tasks are delineated as separate tasks; however, these separately delineated tasks should not be construed as necessarily order dependent in their performance.

The following description sets forth one or more exemplary implementations of a robust recognizer of perceptually similar content that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a robust recognizer of perceptually similar content may be referred to as an "exemplary content similarity recognizer."

Incorporation by Reference

The following co-pending patent applications are incorporated by reference herein:

U.S. patent application Ser. No. 09/843,254, entitled "Recognizer of Audio-Content in Digital Signals" filed on Apr. 24, 2001, and assigned to the Microsoft Corporation; and U.S. patent application Ser. No. 09/421,986, entitled "System and Method for Hashing Digital Images" filed on Oct. 19, 1999, now U.S. Pat. No. 6,671,407 and assigned to the Microsoft Corporation.

Introduction

Figure 4:
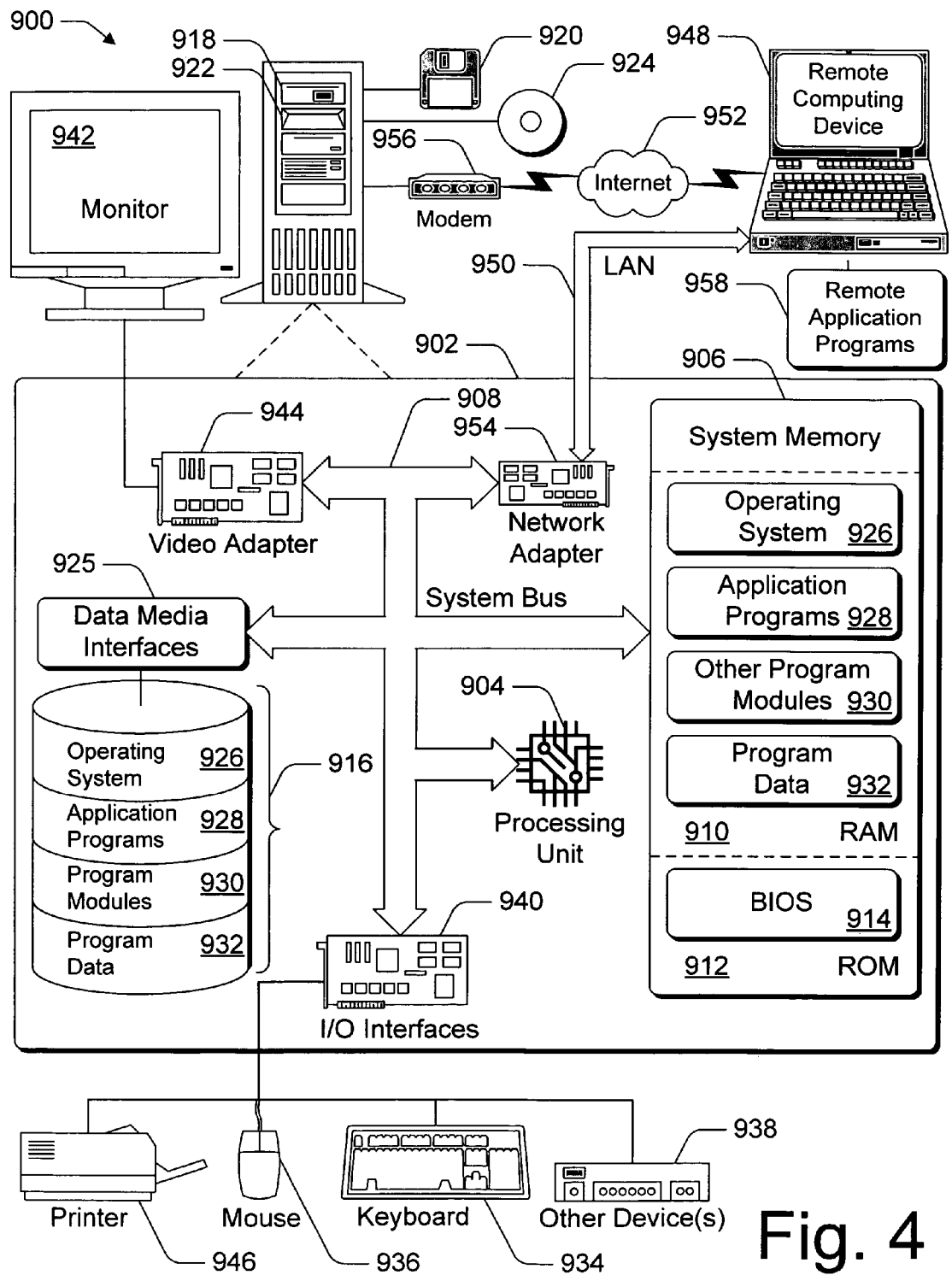
FIG. 4 is an example of a computing operating environment capable of implementing an implementation (wholly or partially) of the invention claimed herein.

The one or more exemplary implementations, described herein, of the present claimed invention may be implemented (in whole or in part) by a content similarity recognition system 100 and/or by a computing environment like that shown in FIG. 4.

At least one implementation is described herein as a technique for generally recognizing content of digital goods by hashing such goods to generate one or more hash values for each good.

At least one implementation is described herein as a technique for recognizing perceptual similarity of content of such goods by comparing "recognition" hash values of the goods. This implementation generates proximally similar (i.e., near) unique identifiers (e.g., hash value) even though some forms of alterations (including intentional and unintentional) have been done to a specimen of the original digital good, given that the altered specimen is perceptually similar to a human observer when comparing the altered specimen with the original specimen. However, if the altered specimen is perceptually distinct, the hashing technique produces a hash value that is not proximally near the hash value of the original.

At least one implementation described herein is a technique that may be combined with the techniques described in U.S. patent application Ser. No. 09/421,986, now U.S. Pat. No. 6,671,407, entitled "System and Method for Hashing Digital Signals" (incorporated by reference) to produce a unique identifier.

The implementations, described herein, may employ one of two exemplary approaches to generating a hash value: Approach A and Approach B. Approach A is particularly suited for applications where there is little or no concern about malicious attacks. Approach B is particularly suited for those applications where there is a concern about such attacks.

Isolated significant components of a signal are not robust. The exemplary content similarity recognizer applies non-linear filtering to eliminate such "spike-like" components. On the other hand, around big masses of significant data, the exemplary content similarity recognizer introduces artificial "blurred tolerance regions" to gain stability (in shape and size) against small differences between signals.

In general, attacks on signals tend to split, distort, bend, stretch, and translate the smaller masses more than the larger ones. The exemplary content similarity recognizer includes iterative and convergent techniques that introduce a self-correcting mechanism.

The description of the implementations of the exemplary content similarity recognizer is particularly directed towards digital goods that are images. Although that is the case, those who are skilled in the art understand and appreciate how to apply these concepts to other digital goods—such as audio, multimedia, video, etc.

Exemplary Applications

Implementations, described herein, of the exemplary content similarity recognizer are suitable for numerous applications, including the following (which are provided as examples and not as limitations): identification, searching & sorting in a database, semantic content categorization, and anti-piracy applications (such as watermarking). Some of the exemplary applications are discussed below:

Locating similar content in a database. The "recognition" hash values may be stored and associated with specific content of a digital good. When searching for such content, a search engine may look for a range of hash values to locate similar content. This is much more efficient that conventional techniques for searching for similar content in a database (which is typically based on keyword searches).

Semantic content categorization. This includes approximate matching of content between two digital goods. The hashing techniques of the exemplary embodiments have a "recognition" value, which can be used to compare if two given items are similar. This hash value may also be called a recognition hash value or simply similarity value.

This "recognition" value may be used to semantically classify content of digital goods. Works of a similar nature tend to have "recognition" values that cluster together. Thus, these values are proximally near each other. This proximal range may be subjectively determined. For some semantic categories, the range may be large and for others it may be small.

The "recognition" can be computed incrementally which means that if the exemplary embodiment slide the window of the digital good, one may compute the value on the new window from the old window without doing substantial reworking on the part that is common to old and new windows.

Anti-piracy search efforts. Using the hashing techniques described herein, one may search for digital goods on the Web suspected of having been pirated. In one way, a subject good may be suspected of being pirated because their "recognition" value is proximally near the "recognition" value of the original digital good. Further examination may be performed to confirm piracy.

In addition, the "recognition" values may be used for content-based key generation or synchronization of streaming multimedia, such as video or audio. In this sense, the "recognition" values provide a mechanism to exactly or approximately identify a subject signal as an original signal.

Perceptually Same and Perceptually Distinct

The exemplary content similarity recognizer treats two "perceptually same" digital signals as the same. Herein, a pair of digital goods are "perceptually same" when their final hash values are the same (alternatively, substantially the same).

This may also be called "perceptually identical," "imperceptibly indistinguishable," or other similar equivalent phrases.

For example, "perceptually same" audio signals include those that sound as if they are they are substantially same to the human ear. For another example, "perceptually same" images include those that appear as if they are they are substantially same to the human eye.

In contrast, "perceptually distinct" digital goods are generally the converse of "perceptually same" digital goods. This may also be called "perceptually different" or "perceptually distinguishable".

Perceptually Similar

The exemplary content similarity recognizer treats two "perceptually similar" digital goods as goods that are similar. Herein, a pair of digital goods are "perceptually similar" when their "recognition" values are close in value (i.e., proximal).

Hashing

Unlike conventional hashing techniques, the output (i.e., hash value) of the hashing techniques implemented by the exemplary content similarity recognizer is invariant when the content of digital goods are perceptually similar. Logically and mathematically, this concept may be explained in the following way.

Let X denote a particular specimen of a digital good (e.g., image, audio clip, etc.). Furthermore, let $\hat{X}$ denote a modified specimen of this good, where this modified specimen is "perceptually similar" to X. Let Y denote a particular specimen of a digital good that is "perceptually distinct" from X. See the above section titled "Perceptually Same and Perceptually Distinct" and "Perceptually Similar" for more details on the meaning of such terminology.

Let L be the final length of the hash, and let $H_K(\cdot)$ represent a hashing function that uses the secret key K. A normalized Hamming distance $D(.,.)$ is used fro comparing two hash values which is the ration of the usual Hamming distance and the size of the imputes.

Given the above, these are the characteristics of the hash values generated by the hashing techniques implemented by the exemplary content similarity recognizer:

Apparently uniformly distributed:

$$Pr[H_K(X) = \alpha] \approx \frac{1}{2^L}, \forall \alpha \in \{0, 1\}^L.$$

Pairwise Independence for perceptually distinct inputs:

$$Pr[H_K(X)=\alpha|H_K(Y)=\beta] \approx Pr[H_K(X)=\alpha], \forall \alpha, \beta \in \{0,1\}^L.$$

Invariance under perceptual similarity:

$$H_K(X)=H_K(\hat{X}) \rightarrow Pr[H_K(X)=H_K(\hat{X})] \approx 1.$$

(Invariance under perceptual similarity may also be described as approximate invariance under small perturbations.)

Hence, in addition to uniform distribution on the hash values, the following is desirable for all possible different digital goods X,Y and for all possible acceptable modified (i.e., perceptually similar) versions of X, represented by $\hat{X}$:

$$D(H_K(X), H_K(\hat{X}))=0; \text{ and}$$

$$D(H_K(X), H_K(Y)) > 0 \text{ (with a high degree of probability)}$$

The hashing techniques implemented by the exemplary content similarity recognizer may have two stages: Intermediate and Final.

Intermediate Stage

At the end of the intermediate stage, the exemplary content similarity recognizer obtains intermediate hash values (i.e., "recognition" values) having a length M, where M>>L and have the following separation property:

$$D(H_K(X), H_K(\hat{X})) < T_1; \text{ and}$$

$$D(H_K(X), H_K(Y)) > T_2 \quad (1)$$

with a high degree of probability, where $0 < T_1 < T_2 < \frac{1}{2}$.

The intermediate hash value may also be called the "content-similarity" hash value, "similarity" hash value, "similarity" value, or "recognition" value. The intermediate hash value is the value that may be used by the exemplary content similarity recognizer to determine "perceptual similarity" of the content of digital goods.

Final Stage

Given the intermediate hash value, the exemplary content similarity recognizer performs randomized (or pseudorandomized) lattice vector quantization to generate the final hash value. This final hash value has the properties mentioned above (regarding uniform distribution, pairwise independence; and invariance).

For more details on hashing relevant to the hashing techniques implemented by the exemplary content similarity recognizer, see U.S. patent application Ser. No. 09/421,986, now U.S. Pat. No. 6,671,407, entitled "System and Method for Hashing Digital Signals" (which is incorporated herein by reference).

Exemplary Content Recognizer

In general, the exemplary content similarity recognizer generates an irreversible compression of the digital signal that dramatically shrinks the input (i.e., the signal) while keeping the essence of the input.

Figure 1:
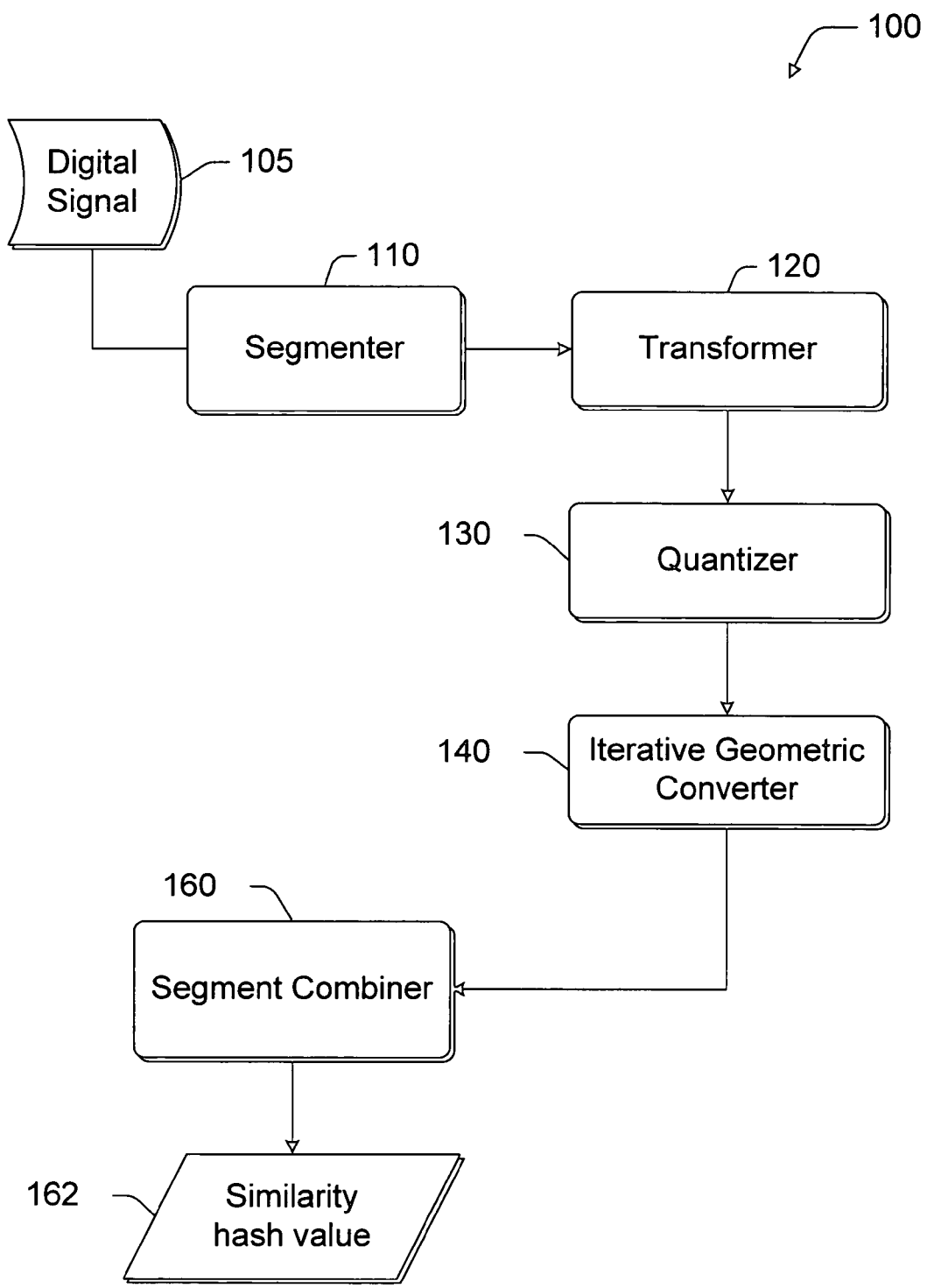
FIG. 1 is a schematic block diagram showing a system in accordance with an implementation of the invention claimed herein.

FIG. 1 shows the content similarity recognition system 100, which is an example of an embodiment of the exemplary content similarity recognizer. The system 100 includes a segmenter 110, a transformer 120, a quantizer 130, an iterative geometric converter 140, and a segment combiner 160.

The segmenter 110 obtains a digital signal 105 (such as an audio clip). It may obtain the signal from nearly any source, such as a storage device or over a network communications link. The segmenter 110 separates it into multiple, pseudorandomly sized and distributed segments. If the signal is an image, the segmenter 110 may separate the image into rectangles, which are pseudorandomly sized and pseudorandomly located within the image. If the signal is an audio clip, the segmenter 110 may separate the clip into rectangles (of two-dimensions of time and frequency), which are pseudorandomly sized and pseudorandomly positioned within the clip. The segments may be overlapping.

The segmenter 110 does not necessarily separate the segments from the signal or from each other. It does not necessarily remove the segments from the signal. Instead, it defines regions or portions of the signal. Those defined regions are the segments.

If Approach A (described below) is being employed, then the segmenter 110 is not necessary.

The transformer 120 obtains a digital signal, which may be a segment of the digital signal 105 (that has been segmented by segmenter 110). The transformer 120 puts the signal in canonical form using a set of transformations. Specifically, for image (for example), discrete wavelet transformation (DWT) may be employed since it compactly captures significant signal characteristics via time and frequency localization. Other transformations may be used. For instance, shift-invariant and shape-preserving "complex wavelets" and any overcomplete wavelet representation or wavelet packet are good candidates (particularly for images).

The transformer 120 also finds the DC subband of the initial transformation (e.g., subband of the DWT). This DC subband of the transformed signal is passed to the quantizer 130.

In general, the transformer gets a significant frequency subband. That may be a low or the lowest subband (e.g., the DC subband). The lower frequency subbands are suitable because they tend to remain relatively invariant after signal perturbation.

The result of this transformer is a transformed signal. When the subject is an image, an example of a suitable transformation is discrete wavelet transformation (DWT). When the subject is an audio clip, an example of a suitable transformation is MCLT (Modulated Complex Lapped Transform). However, most any other similar transformation may be performed in alternative implementations.

In the frequency domain, the quantizer 130 applies a multi-level (e.g., 2, 3, 4) quantization on the output of the transformer 120 to obtain quantitized data (e.g., binary data) given a Hamming weight for output. Of course, other levels of quantization may be employed. Various quantizers could be used as long as suitable distortion metrics (instead of Hamming metric) are available to control the global behavior of the quantized data. The quantizer 150 may be adaptive or non-adaptive.

The iterative geometric converter 140 applies (iteratively) order-statistics filtering, local smoothing (e.g., local averaging), and two-level quantization (given Hamming weight of output). Of course, other levels of quantization may be employed. More details regarding the function of the converter 140 are provided below in the discussion of Approaches A and B.

The segment combiner 160 collects the multiple, pseudo-randomly sized and distributed segments (produced by the segmenter 110) to generate an output that is the "recognition" value 162 (i.e., intermediate hash value). The combiner then applies pseudorandom projection on the collected data.

If Approach A (described below) is being employed, then the segment combiner 160 is not necessary.

The functions of aforementioned components of the content similarity recognition system 100 of FIG. 1 are explained in more detail below.

Methodological Implementation of the Exemplary Content Recognizer

Figure 2:
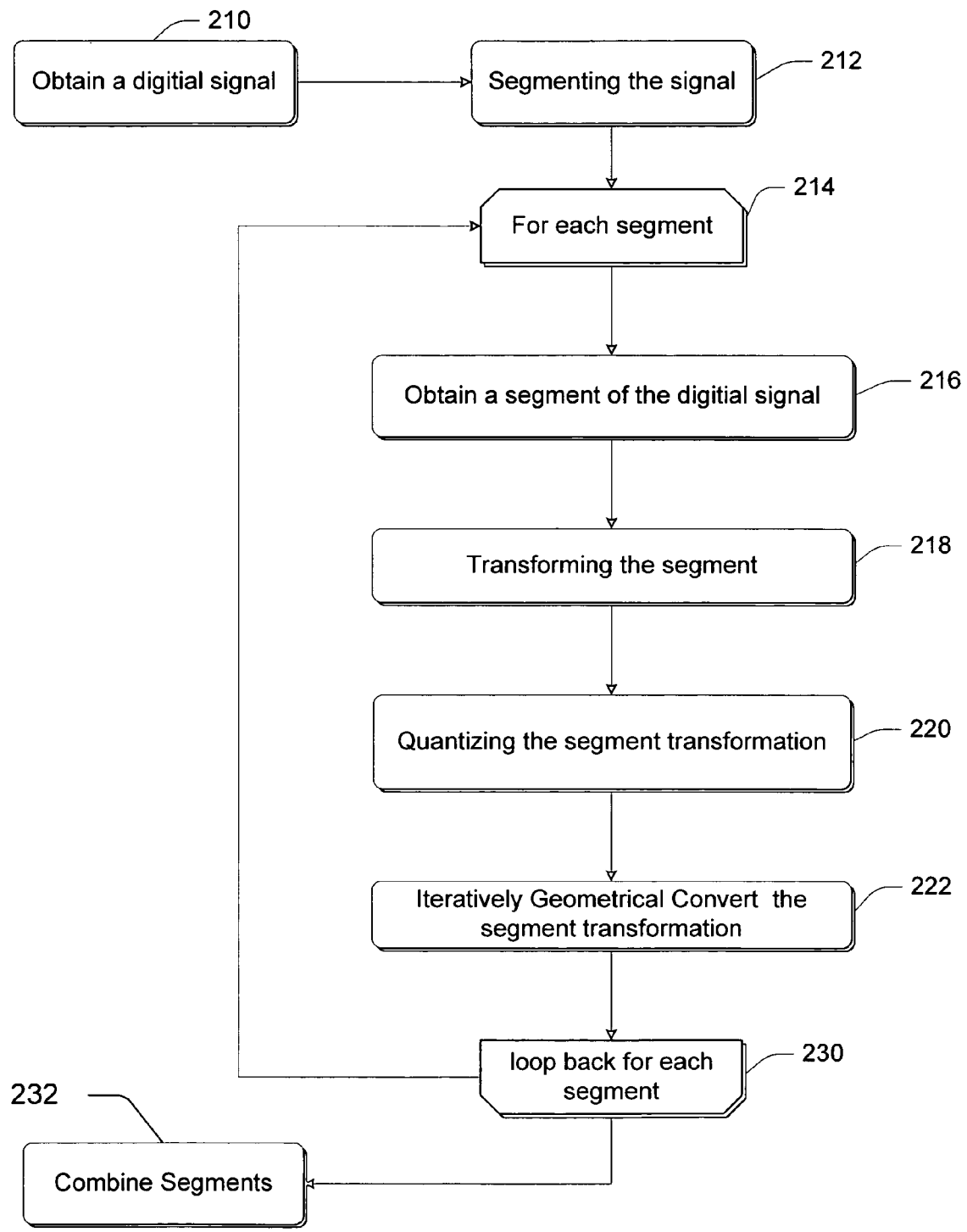
FIG. 2 is a flow diagram showing an illustrative methodological implementation of the invention claimed herein.

FIG. 2 shows methodological implementations of the exemplary content similarity recognizer performed by the content similarity recognition system 100 (or some portion thereof). These methodological implementations may be performed in software, hardware, or a combination thereof.

FIG. 2 shows both Approach A and Approach B. Approach A does not include blocks 210, 212, 214, 230, and 232. In the other blocks, replace the word "segment" with signal for Approach A. Approach B includes all of the blocks of FIG. 2.

For both approaches, the hash values of separate inputs are compared to determine perceptual similarity. This may be done using normalized Hamming distance. Perceptual distortion metrics may be used as well.

Approach A

Approach A is particularly suited for applications where there is little or no concern about malicious attacks. This approach does not use a secret key and hence there is no pseudorandomness involved. Blocks 210, 212, and 214 are not performed for this approach.

At 216 of FIG. 2, Approach A begins. The exemplary content similarity recognizer obtains a digital signal. At 218, it transforms the signal. For example, it may employ a discrete wavelet transformation (DWT) on the signal since it compactly captures significant signal characteristics via time and frequency localization.

At 220 and 222, the exemplary content similarity recognizer quantizes the transformed signal. The output of the quantizer is subject to iterative geometric conversion. The recognizer picks up the significant regions by thresholding (e.g., 2-level quantization). To gain robustness against modifications, the recognizer employs a simple iterative filtering technique that minimizes the presence of "geometrically weak components" and enhance the "geometrically strong components" by means of region growing.

A region that has isolated significant components (i.e., geometrically weak) is a good candidate to be erased via modifications, whereas a region that has massive clusters of significant components (i.e., geometrically strong) would probably remain. However, the location might be perturbed a little and the shape of the cluster could be varied slightly. Unlike the conventional techniques, the recognizer relies on the convergence of a self-correcting iterative procedure.

The number of potential limits for the set of all meaningful signals is large enough since the output is based on the geometric structure of the input signal. Due to the self-correcting nature of this function, the output of the iterative geometric conversion is probably a stable attractive point for the region of most possible slight modifications.

Let X represent the input signal, L be the number of levels DWT that is applied. Let W(x) be the normalized Hamming weight of any binary input x, which is the ratio of the usual Hamming weight and the size of the input. For a given two-dimensional matrix A, let A (i,j) represent the $(i,j)^{th}$ entry of A.

Order-statistics filtering $S_{[m,n],p}(\bullet)$: Given a two-dimensional input A, $S_{[m,n],p}(A)=B$, where $\forall i,j, B(i,j)$ is equal to the $p^{th}$ element of the sorted set of $\{A(i',j')\}$, where $i' \in \{i-m, i-m+1, \ldots, i+m\}$ and $j' \in \{j-n, j-n+1, \ldots, j+n\}$ (sorting is done in ascending order); here the term $S_{[m,n],p}(\bullet)$ is the order-statistics filter. For order-statistics filtering to be equivalent to two-dimensional median filtering if, for example, for a window of size $(2m+1) \times (2n+1)$, then p is chosen as $2mn+m+n+1$.

During geometric region growing, the exemplary content similarity recognizer also use linear shift invariant filtering via two-dimensional FIR filter f, which has low pass characteristics and introduces blurry regions around significant components.

The following is a continued description of Approach A with some reiteration of the above description:

Transformation. At 218, the exemplary content similarity recognizer finds the DWT of X up to level L. Let $X_A$ be the resulting DC subband.

Quantization. At 220, the exemplary content similarity recognizer performs a thresholding operation (e.g., 2-level quantization) on $X_A$ to produce a binary map M. The map M may be represented in this fashion: $M(i, j)=1$ if $X(i, j) \geq T$ or 0 otherwise. T is chosen such that the $W(M) \approx q$, where $0<q<1$ is a parameter.

Geometric Region Growing. At 222, the exemplary content similarity recognizer performs "geometric region growing" (i.e., "iteratively geometrical conversion"). Let $M_1=M$ and ctr=1.

Order-Statistics Filtering. It performs order-statistic filtering on $M_1$. $M_2:=S_{[m,n],p}(M_1)$, where m, n and p are parameters.

Local Smoothing. It applies a two-dimensional linear shift-invariant filtering on $M_3$ via filter f, where $M_3(i,j)=A \, M_2(i,j)$; f and A are parameters. Let the output be $M_4$.

Quantization. Apply a thresholding operation on $M_4$. This operation is similar to the one performed in block 220. Let $M_5$ be the output, such that $W(M_5) \approx q$ and ctr=ctr+1.

The above order-statistics filtering, local smoothing, and quantization of block 222 are repeated (i.e., iterated) until ctr$\geq$C. At that point, block 222 generates the recognition hash value $H(X)=M_5$. Otherwise, for each iteration within block 222, the exemplary content similarity recognizer finds $D(M_5, M_1)$; if it is less then $\epsilon$ (convergence achieved), then end the iterations and generate the recognition hash value $H(X)=M_5$. If it is not less then $\epsilon$ (convergence not achieved), then set $M_1=M_5$ and ctr=ctr+1 and perform another iteration.

Figure 3A:
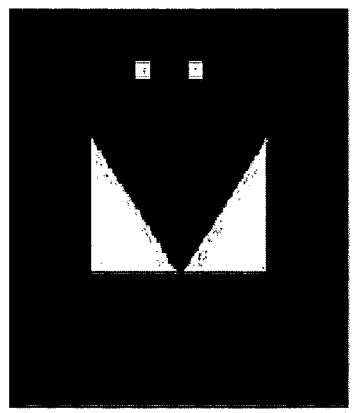
FIGS. 3A-3D visually illustrate the results of an implementation of the invention claimed herein or a portion of such implementation.
Figure 3C:
Figure 3B:
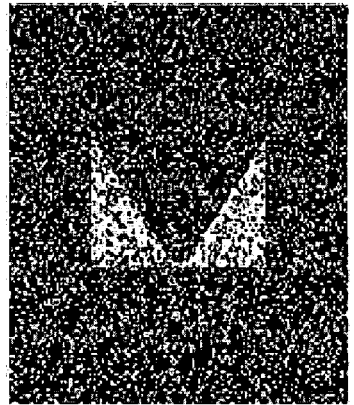
Figure 3D:
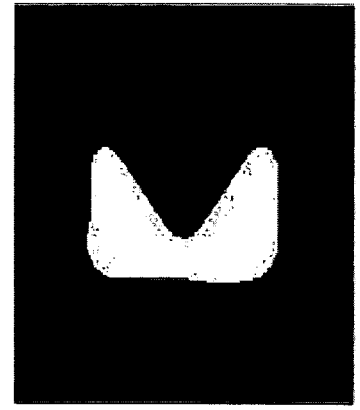

FIGS. 3A-3D illustrate the results of the iterative geometric region growing (GRG) of block 222. FIG. 3A represents an original, unmodified image before iterative GRG is applied. FIG. 3B represents the same image, but it has been modified. Specifically, noise has been added to the image and a thin bridge has been formed between the triangles. FIG. 3C is a visual representation of the output of the iterative GRG applied to the original image of FIG. 3A. FIG. 3D is a visual representation of the output of the iterative GRG applied to the original image of FIG. 3B.

Instead, the reader is directed to notice the similarity of the visual representations of FIGS. 3C and 3D. These are visual representation of hash values that can be easily compared mathematically. When they are compared mathematically by a computer system (and in this example visually by humans), it may be noticed that the representations of FIGS. 3C and 3D are similar. Consequently, one may conclude that the originals (FIGS. 3A and 3B) for these representations are similar. Indeed, one can visually see that the images of FIGS. 3A and 3B are similar. More precisely, they are perceptually similar.

Returning now to the description of the methodological implementation of Approach A, the iterative GRG (block 222 of FIG. 2) generates the "recognition" value (i.e., intermediate hash value), which is also called the recognition hash value. If this hash value is equal to or proximally near the recognition hash value of another signal, then this indicates a similarity. This proximal range may be subjectively determined. Of course, the degree of similarity may be fine-tuned by setting this proximal range.

Approach B

Approach B is particularly suited for those applications where there is a concern about malicious attacks. This approach does use a secret key and hence there is pseudorandomness involved. This approach includes Approach A as a special case with no randomness and using largest segment possible in a one-segment initialization. All blocks of FIG. 2 are included.

At 210 of FIG. 2, the exemplary content similarity recognizer obtains the digital signal. It may obtain the signal from nearly any source, such as a storage device or over a network communications link. At 212, the signal is separated into multiple, pseudorandomly sized and distributed segments. The segments may be overlapping.

These segments may be two-dimensional (or more dimensions) shape mapped onto a representation of the signal. Typically, representation and the segments have the same dimensions. The exemplary content similarity recognizer typically will generate a sufficient quantity of segments to adequately cover the representation of the signal.

For each segment, blocks 214-230 are repeated. Blocks 216-222 are performed in the same manner as Approach A, except that one segment is processed each loop through.

At 232 of FIG. 2, after the last segment is processed, the exemplary content similarity recognizer combines the segments. It collects the multiple, pseudorandomly sized and distributed segments to generate an output that is the recognition hash value (i.e., intermediate hash value). This hash value may be a simple combination of the hash values of each segment. It may be a composite of the segments' hash values. It may be a listing of the segments' hash values. It may be a hash of the segments' hash values. It may be any other representation of the segments' hash values.

Contrast with Halftoning

Image halftoning produces a binary version of the input image, but where perceptual quality and similarity of the output is paramount. In other words, the results of image halftoning will be and are intended to be perceptually approximate the original image. In contrast, output of the exemplary content similarity recognizer (or some subset thereof) is not necessarily related to the original representation. If the signal is an image, the output of the exemplary content similarity recognizer (or some subset thereof) does not necessarily look like the original. Of course, it may look like the original, but it is not a necessary requirement.

Exemplary Computing System and Environment

FIG. 4 illustrates an example of a suitable computing environment 900 within which an exemplary content similarity recognizer, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary content similarity recognizer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary content similarity recognizer may be described in the general context of computer-executable instructions, such as program modules, being executed by a computer. Generally, program modules include routines, programs, objects, components, data structures, etc. that perform particular tasks or implement particular abstract data types. The exemplary content similarity recognizer may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 4 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a quantizer, a segmenter, a combiner, a transformer, and an iterative-geometric converter.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary content similarity recognizer may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 4 illustrates an example of a suitable operating environment 900 in which an exemplary content similarity recognizer may be implemented. Specifically, the exemplary content similarity recognizer(s) described herein may be implemented (wholly or in part) by any program modules 928-930 and/or operating system 926 in FIG. 4 or a portion thereof.

The operating environment is only an example of a suitable operating environment and is not intended to suggest any limitation as to the scope or use of functionality of the exemplary content similarity recognizer(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary content similarity recognizer may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological tasks, it is to be understood that the invention defined in the appended claims is not necessarily limited to the specific features or tasks described. Rather, the specific features and tasks are disclosed as preferred forms of implementing the claimed invention.

The invention claimed is:

1. A computer-implemented method facilitating similarity recognition of a digital signal, the method comprising:
    obtaining a digital signal; and
    deriving a recognition value representative of the digital signal such that perceptually distinct digital signals result in recognition values that are approximately independent of one another and perceptually similar digital signals result in proximally similar recognition values, wherein the deriving comprises transforming the digital signal to a frequency domain and hashing the transformed digital signal to produce the recognition value representative of the digital signal.

2. A method as recited in claim 1 further comprising comparing the recognition value with another recognition value derived from another digital signal.

3. A method as recited in claim 1, wherein the recognition value is a hash value.

4. A method as recited in claim 1, wherein the digital signal is a digital image signal.

5. A computer comprising one or more computer-readable media having computer-executable instructions that, when executed by the computer, perform the method as recited in claim 1.

6. A computer-implemented method facilitating similarity recognition of a digital signal, the method comprising:
    obtaining a digital signal;
    transforming the digital signal to generate a transformed signal in a frequency domain;
    non-linear filtering of the transformed signal to eliminate isolated significant components of the signal and generate a filtered signal;
    deriving a recognition value from the filtered signal, the recognition value being representative of the digital signal such that perceptually distinct digital signals result in recognition values that are approximately independent of one another and perceptually similar digital signals result in proximally similar recognition values, wherein the deriving comprises hashing the filtered signal to produce the recognition value representative of the digital signal.

7. A method as recited in claim 6, wherein isolated significant components of the signal are those that are geometrically weak.

8. A computer-readable medium having computer-executable instructions that, when executed by a computer, performs the method as recited in claim 6.

9. A computer-readable medium having computer-executable instructions that, when executed by a computer, performs a method comprising:
    obtaining a digital signal; and
    deriving a recognition value representative of the digital signal such that perceptually distinct digital signals result in recognition values that are approximately independent of one another and perceptually similar digital signals result in proximally similar recognition values, wherein the deriving comprises:
    transforming the digital signal to a frequency domain;
    quantizing the digital signal that has been transformed to eliminate isolated significant components of the digital signal; and
    hashing the digital signal that has been quantized to produce the recognition value representative of the digital signal.

* * * * *